United States Patent [19]

Ayata et al.

[11] Patent Number: 4,520,373

[45] Date of Patent: May 28, 1985

[54] DROPLET GENERATING METHOD AND APPARATUS THEREFOR

[75] Inventors: Naoki Ayata; Yoshiaki Shirato, both of Yokohama; Yasushi Takatori, Sagamihara; Mitsuaki Seki, Machida, all of Japan

[73] Assignee: Canon Kabushiki Kaisha, Tokyo, Japan

[21] Appl. No.: 471,842

[22] Filed: Mar. 3, 1983

Related U.S. Application Data

[62] Division of Ser. No. 133,327, Mar. 24, 1980.

[30] Foreign Application Priority Data

| Apr. 2, 1979 | [JP] | Japan | 54-39467 |
| Apr. 2, 1979 | [JP] | Japan | 54-39468 |
| Apr. 2, 1979 | [JP] | Japan | 54-39469 |
| Apr. 2, 1979 | [JP] | Japan | 54-39470 |
| Apr. 2, 1979 | [JP] | Japan | 54-39471 |
| Apr. 11, 1979 | [JP] | Japan | 54-39472 |
| Feb. 22, 1980 | [JP] | Japan | 55-21348 |

[51] Int. Cl.³ .................... G01D 15/16; H05B 3/00
[52] U.S. Cl. .................... 346/140 R; 219/216
[58] Field of Search .......... 219/216 PH; 346/140 PD, 346/140 IS, 75

[56] References Cited

U.S. PATENT DOCUMENTS

| 3,488,664 | 1/1970 | Winston ................. 346/75 |
| 3,560,641 | 2/1971 | Taylor et al. ............ 346/75 |
| 3,953,708 | 4/1976 | Thornburg .............. 219/216 PH |
| 3,988,745 | 10/1976 | Sultan .................. 346/140 PD |
| 4,034,187 | 7/1977 | Tomioka et al. ......... 219/216 PH |
| 4,063,254 | 12/1977 | Fox et al. ............... 346/75 |
| 4,074,284 | 2/1978 | Dexter et al. ........... 346/140 PD |
| 4,095,237 | 6/1978 | Amberntsson et al. .... 346/140 PD |
| 4,141,018 | 2/1979 | Mizuguchi et al. ....... 219/216 PH X |
| 4,216,483 | 8/1980 | Kyser et al. ............. 346/140 PD |
| 4,243,994 | 1/1981 | Kobayashi et al. ....... 346/140 PD |

FOREIGN PATENT DOCUMENTS

| 27622 | 10/1972 | Japan . |
| 9622 | 2/1973 | Japan . |
| 64843 | 9/1973 | Japan . |
| 16757 | 4/1974 | Japan . |
| 84249 | 1/1975 | Japan . |
| 110230 | 8/1975 | Japan . |
| 118629 | 9/1975 | Japan . |
| 14030 | 2/1976 | Japan . |
| 104224 | 9/1976 | Japan . |
| 39495 | 10/1976 | Japan . |
| 128227 | 11/1976 | Japan . |
| 132036 | 11/1976 | Japan . |
| 16674 | 4/1977 | Japan . |
| 92733 | 7/1977 | Japan . |
| 102039 | 8/1977 | Japan . |

OTHER PUBLICATIONS

*Nikkei Electronics*, Jul. 11, 1977, pp. 54–67.
*Denki Kagaku*, Feb. 1979, pp. 13–22.

*Primary Examiner*—Donald A. Griffin
*Attorney, Agent, or Firm*—Fitzpatrick, Cella Harper & Scinto

[57] ABSTRACT

This invention discloses a recording apparatus having at least transistors, gates and a latch circuit for driving plural heating elements, and also discloses a recording head in which a conductive member is connected electrically to heating elements.

23 Claims, 32 Drawing Figures

DROPLET GENERATING METHOD AND APPARATUS THEREFOR

This is a division of application Ser. No. 133,327, filed Mar. 24, 1980.

BACKGROUND OF THE INVENTION

1. Field of the Invention

The present invention relates to a recording apparatus utilizing heating elements for thermal recording on a recording sheet.

2. Description of the Prior Art

Conventional recording apparatus utilizing heating elements for thermal recording has been associated with various defects in the circuit board structure, wirings, arrangement of control chips etc. and shows difficulty in high-density assembly. Also the heating elements have difficulty in high-density arrangement, uniformity of performance and durability.

SUMMARY OF THE INVENTION

The object of the present invention is to resolve the above-mentioned drawbacks inherent to the conventional recording apparatus utilizing heating elements.

DESCRIPTION OF THE PREFERRED EMBODIMENTS

Figure 1:
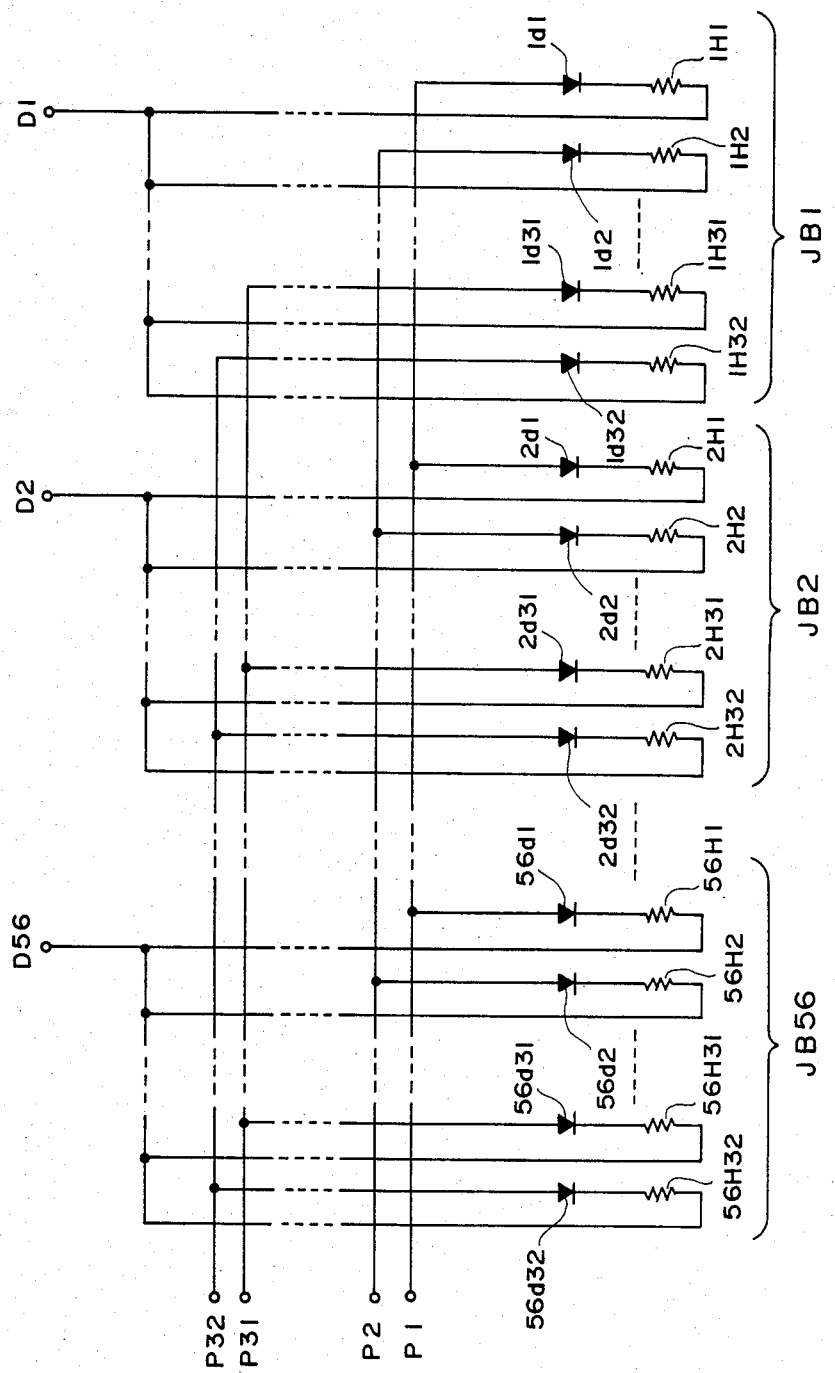
FIG. 1 is a circuit diagram showing an example of a heating element drive circuit applicable to the present invention.
Figure 2:
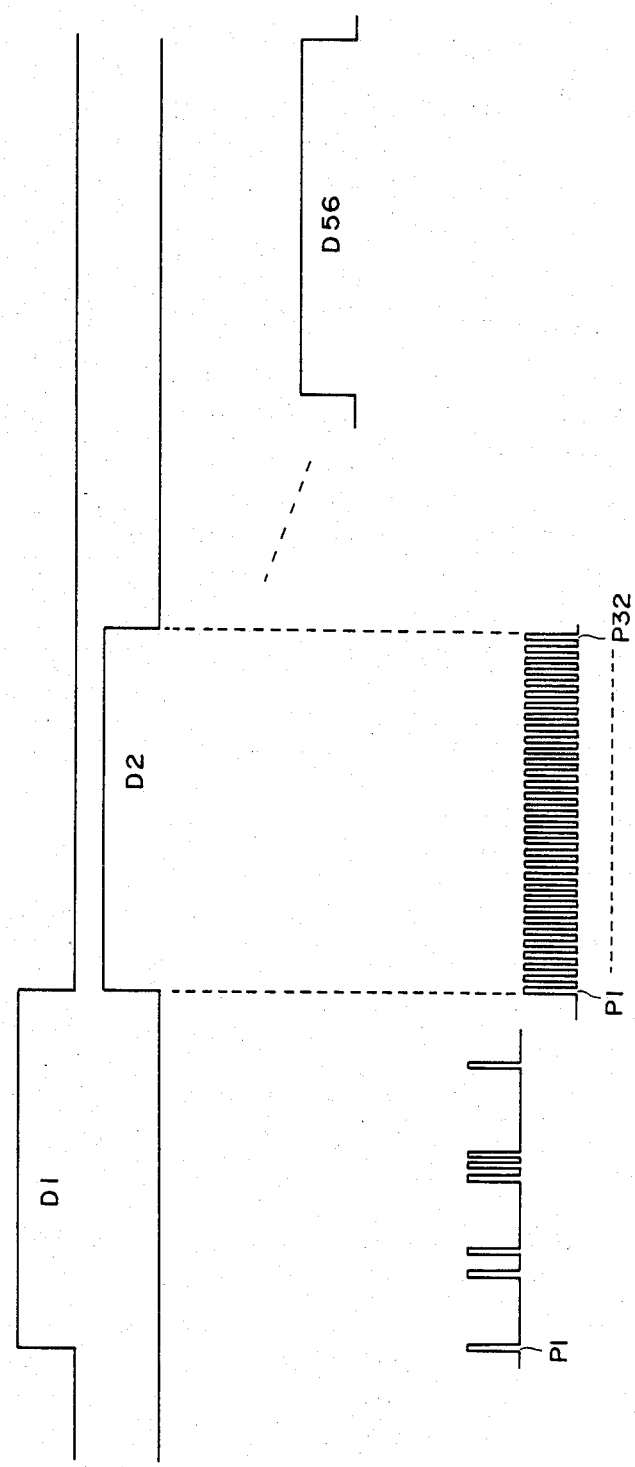
FIG. 2 is a waveform chart showing the function of the above-mentioned circuit.

FIGS. 1 and 2 respectively show an example of the heating element driving circuit applicable in the present invention and a corresponding waveform chart, wherein 1792 heating elements 1H1–56H32 are divided into 56 groups each composed of 32 heating elements, for example 1H1–1H32, and said heating elements are respectively connected at one ends thereof to 1792 control elements, for example diodes 1d1–56d32 which are also divided into 56 groups each composed of 32 diodes for example 1d1–1d32. Said diodes are connected to image information input terminal P1–P32. The heating elements 1H1–1H32 are connected at the other ends to a group selecting signal input terminal D1. Similarly the heating elements 2H1–2H32, . . . , 56H1–56H32 are connected to group selecting signal input terminals D2–D56. In such a circuit the heating elements of each group are activated by time-divided drive with a duty ratio of 1/56. The power required for driving simultaneously the heating elements in a group is relatively limited when the number of image signals is small, as shown by D1 in FIG. 2, but becomes significantly large if 32 elements are to be simultaneously driven as shown by D2.

Figure 3:
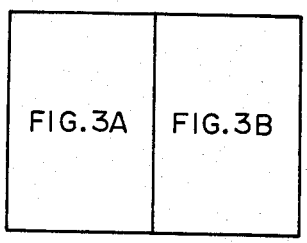
FIGS. 3, 3A, and 3B are is a circuit diagram
Figure 3A:
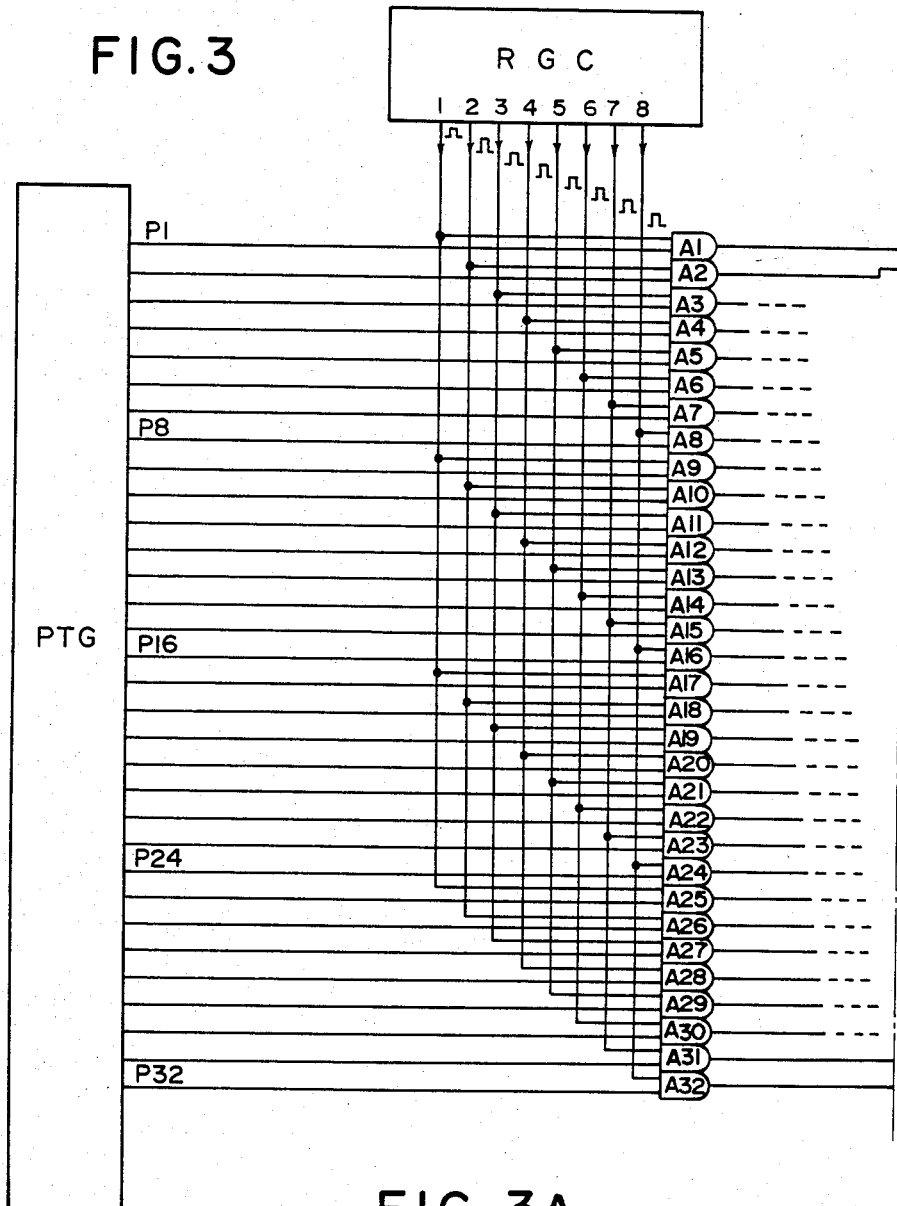
Figure 3B:
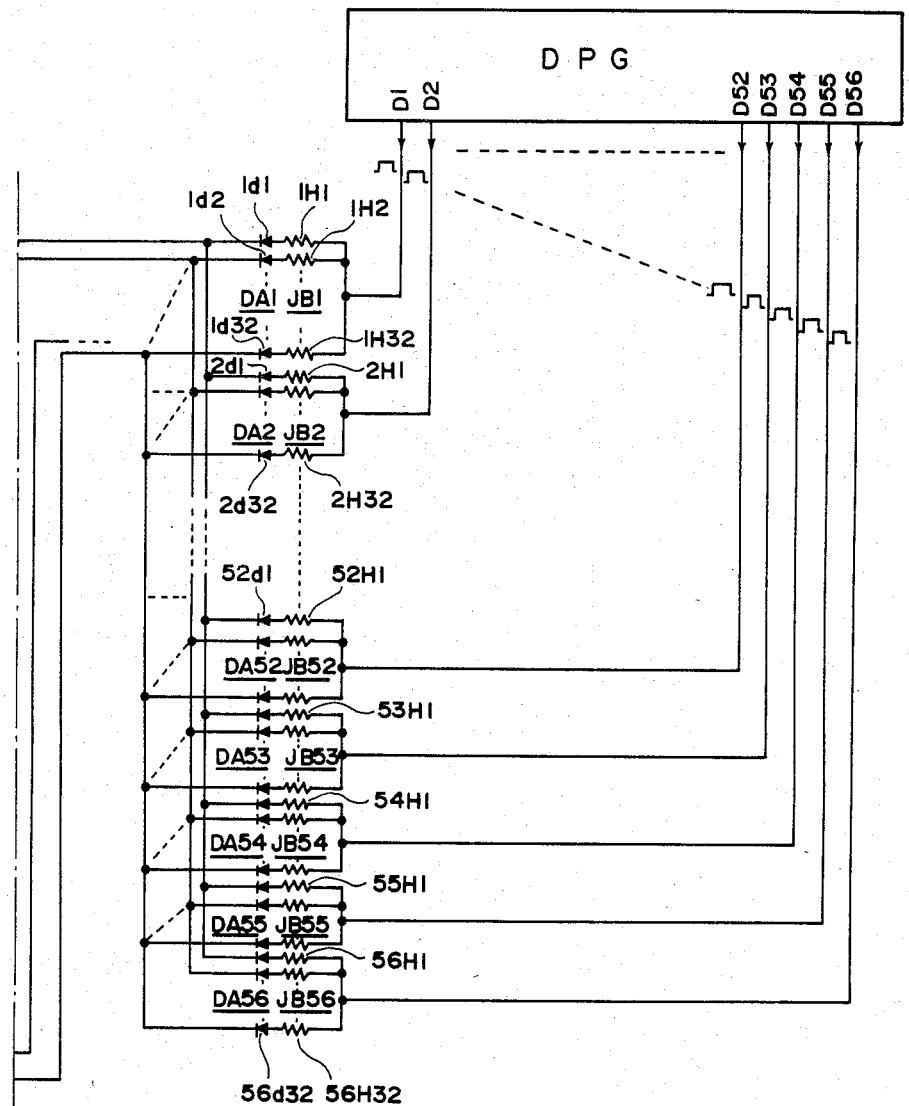
Figure 4:
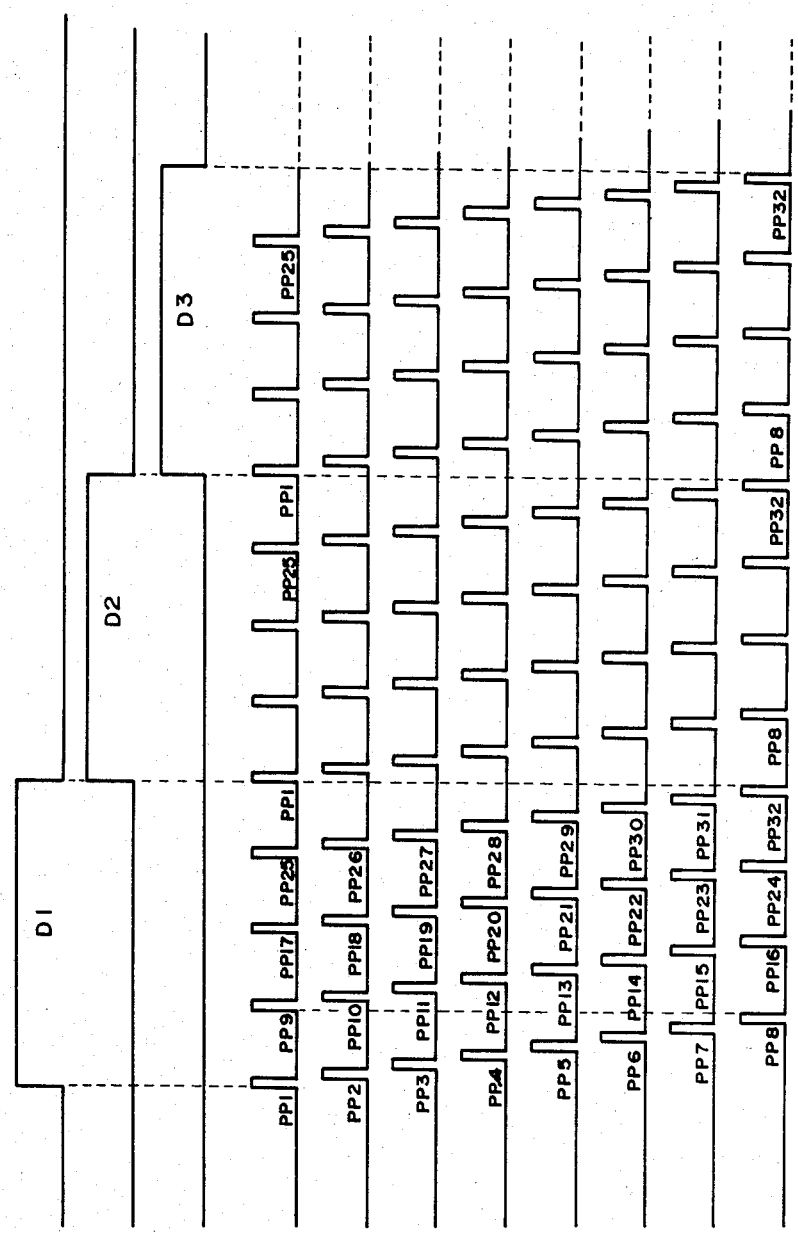
FIG. 4 is a waveform chart showing the function thereof.
Figure 5:
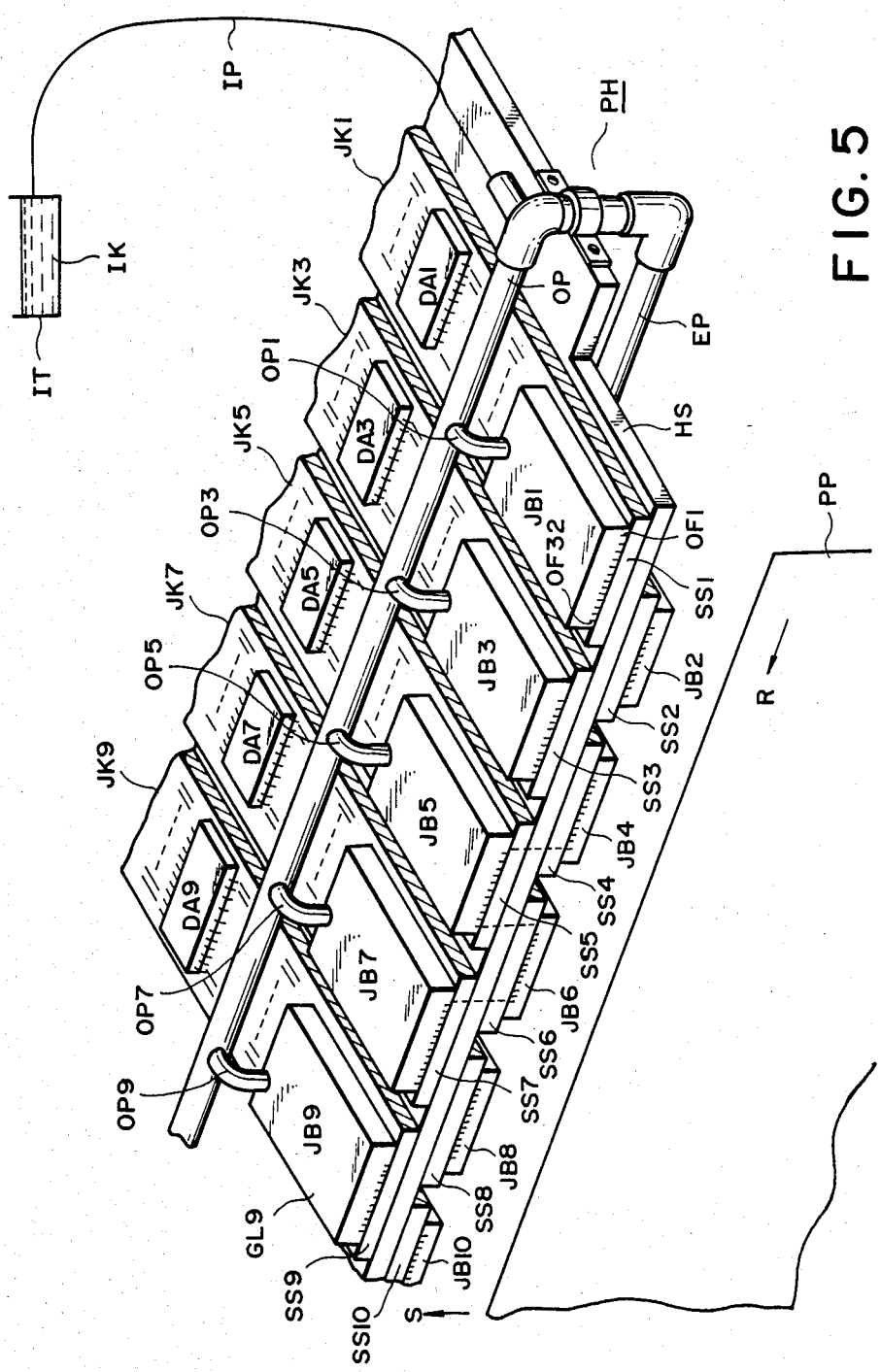
FIG. 5 is a perspective view showing an embodiment of the recording unit of the present invention.

FIG. 3 shows an example of the circuit capable of resolving such a problem, wherein provided are an image information generator PTG, a group selecting signal generator DPG and a signal generator RGC composed for example of a ring counter or a read-only memory to drive only four heating elements, for example H1, H9, H17 and H25 at a time and then other four elements H2, H10, H18 and H26. Only 4 elements, mutually spaced by 8 elements, are selected for simultaneous drive by AND gates A1–A32. In this manner the power required to drive simultaneously 32 elements is reduced to $\frac{1}{8}$ compared with the case shown in FIG. 2. As shown in FIG. 4, 4 elements, mutually spaced by 8 elements in a group of 32 elements, are at first activated to record 4 dots, then neighboring 4 elements are activated to record other 4 dots, and such step is repeated 8 times to complete a line of 32 dots. FIG. 5 is a perspective view of a recording unit capable of generating ink droplets for recording by means of the aforementioned heating element driving circuit.

Figure 6:
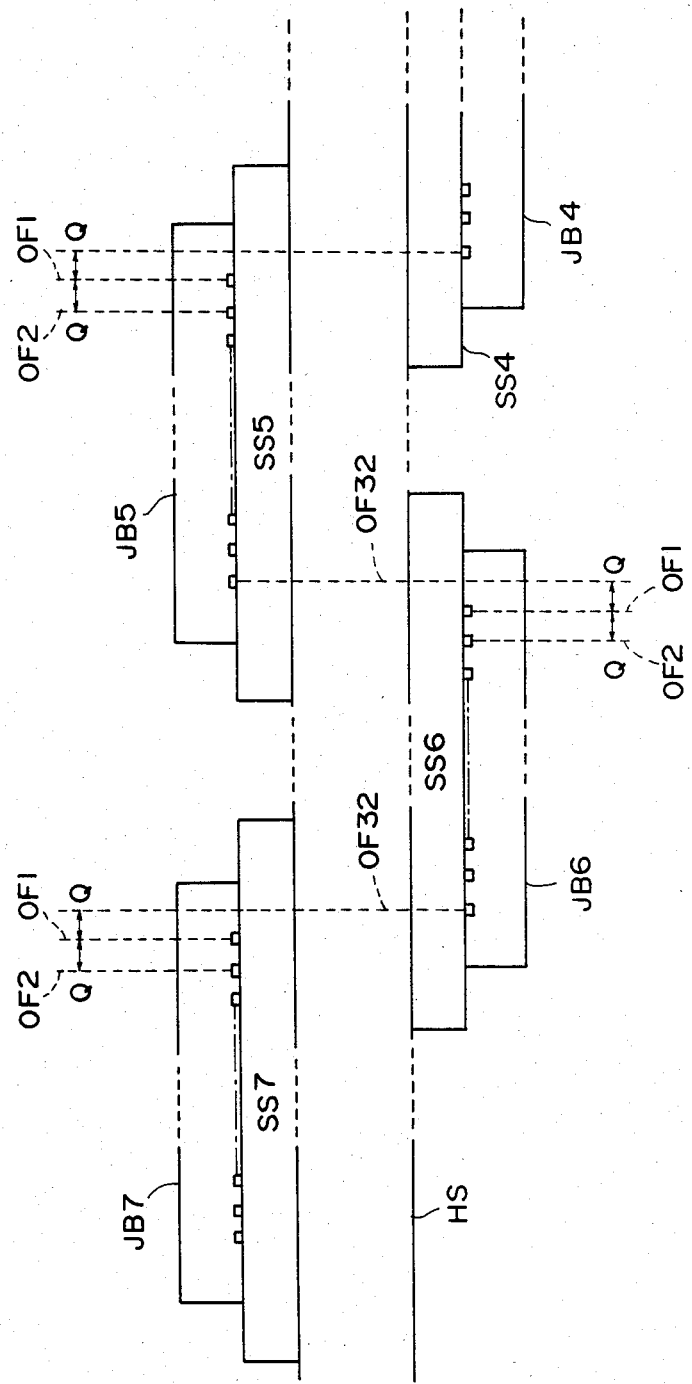
FIG. 6 is a front view thereof.

The present embodiment provides a so-called full-multi ink jet recording head for A4 size with a recording density of 8 dots/mm, wherein 56 substrates each having 32 heating elements are alternately adhered on both sides of a metal heat sink HS, and on said substrates SS1–SS56 with heating elements respectively adhered are plates JB1–JB56 each having 32 grooves. Said plates are respectively connected to ink supply pipes OP-1–OP56 which are in turn connected to an ink tank IT through ink supply pipes OP, EP. Control element arrays DA1–DA56, for example diode chips, are connected with lead wires of said substrates with heating elements. As shown in FIG. 6, a dot distance Q corresponding to 8 dots/mm can be advantageously secured by dividing said control element chips into an odd-numbered group and an even-numbered group so that a third chip is positioned next to a first one, a fourth chip is positioned next to a second one, and so on.

Figure 7:
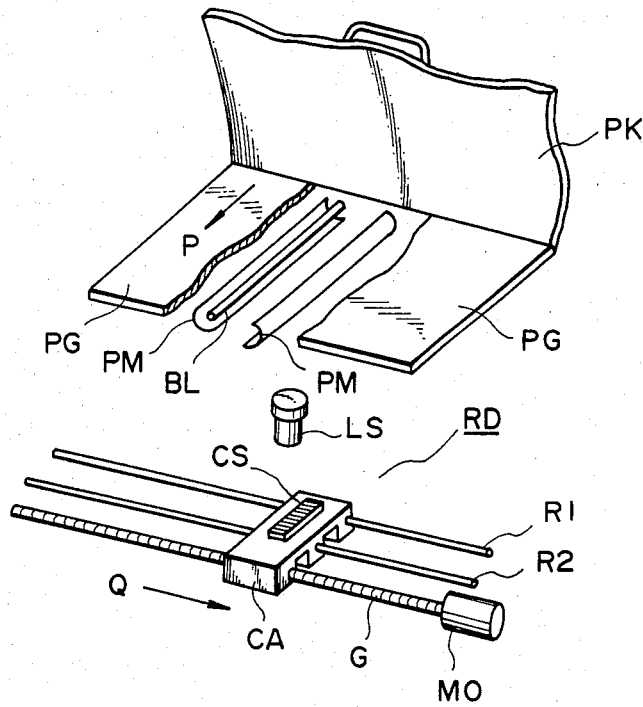
FIG. 7 is a schematic view of an original recording unit.
Figure 8:
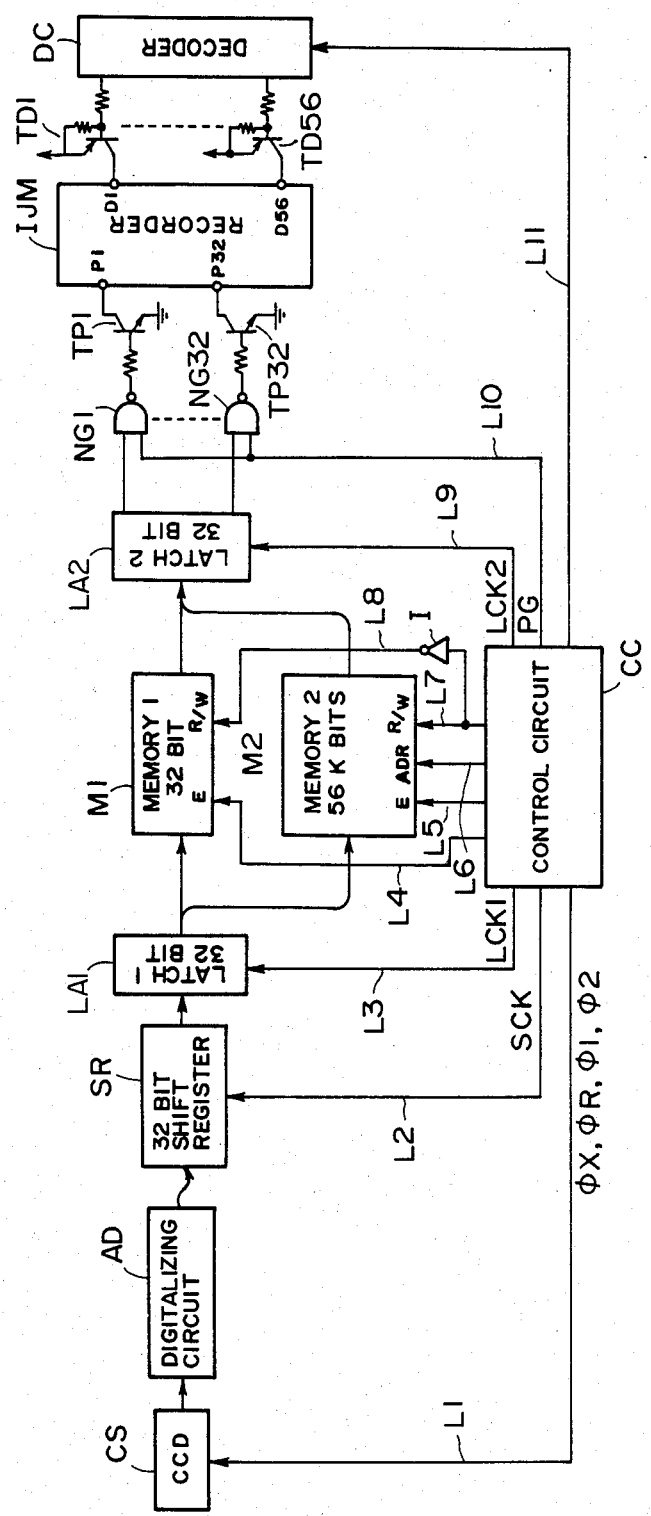
FIG. 8 is a block diagram of an embodiment of the present invention.

FIGS. 7 and 8 schematically show a copier or a facsimile apparatus utilizing the aforementioned full-multi recording head and time-divided driving circuit. Said copier or facsimile apparatus is provided with a reader RD for reading an original document, which is equipped with a glass platen PG for supporting said document and a platen cover PK for fixing said document.

Under said platen PG there are provided a light source BL for illuminating said original document, mirrors RM for directing effectively the light from said light source toward said original document, a self-scanning photosensor CS having a linear array of plural photosensor elements and an optical unit LS having a lens for focusing the image of said original document onto said photosensor CS in integral manner. Said optical unit LS and photosensor CS are fixed on a carriage CA, which is displaced in a forward direction Q or an inverse direction along guide rails R1, R2 by means of a rotating screw G driven by a motor MO. An arrow P indicates the main scanning direction of the self-scanning photosensor CS on said original document. Consequently the information of the original document placed on the platen PG is successively focused on the photosensor CS by the displacement of the carriage CA performing the subsidiary scanning in the direction Q, and sequential signals corresponding to the raster scanning of the original can be obtained from said photosensor CS performing the main scanning.

In the present embodiment the platen PG is fixed while the carriage CA is rendered movable, but it is also possible to use a movable platen PG in combination with a stationary carriage CA. In case of copy recording the original on the platen is scanned in the direction P while the carriage CA is displaced in the direction Q. At the same time image is recorded in a direction R shown in FIG. 5 while a recording sheet is displaced in a direction S at a same speed as that of said carriage CA in the direction Q. The signals obtained in the reader are supplied to the recording unit PH shown in FIG. 5 through a buffer memory for simultaneous recording, but it is also possible to store the signals in a memory and to record said signals afterwards.

Said self-scanning photosensor CS is composed of a plurality of photosensor elements capable of converting optical input into electrical signals and is capable of sequentially processing said signals. Examples of such photosensor are charge-couple device (CCD) and MOS image sensor. In the present embodiment it is assumed that the width of the platen in the direction P is 216 mm which is substantially equal to the shorter side of A4 size, that the photosensor is composed of a CCD linear image sensor of 1728 bits, and that the recording unit PH is composed of a full-line multiple recording head of 1792 dots over a width of 224 mm. The combination of such image sensor and recording head provides a resolving power of 8 dots/mm. It is further assumed that 28 arrays, positioned on the heat sink HS and constituting the odd-numbered group, and 28 arrays, positioned under the heat sink and constituting the even-numbered group, are vertically separated by a distance of 8 mm corresponding to 64 scanning lines. The CCD photosensor CS having 1728 bits scans each line to provide voltage levels corresponding to the image information, and said voltage levels are converted by an analog-to-digital (A/D) converter AD shown in FIG. 8 into binary signals, or into multiple-level signals if a tonal gradation is required in the image reproduction. In case of obtaining binary signals, said A/D converter AD is composed of a comparator which compares the output voltage of the CCD photosensor CS with a reference voltage or a slice level and provides a high- or low-level output signal in response to the level of said voltage from the CCD photosensor. The digitized signals are serially supplied to a 32-bit shift register SR for conversion into parallel 32-bit signals for subsequent processing. The parallel output signals from said shift register SR are temporarily latched in a 32-bit latch circuit L1 and transferred than to a memory unit composed of memories M1, M2, wherein the memory M1 is adapted to store the signals for the odd-numbered blocks JB1, JB3, ... while the memory M2 is adapted to store the signals for the even-numbered blocks JB2, JB4, .... The signals retained in said latch circuit L1 are alternately supplied, every 32 bits, to the memory M1 and to the memory M2. Said memories M1, M2 are composed for example of random access memories, CCD memories or magnetic memories, and have capacities of 32 bits and 56 Kbits, respectively. A word is composed of 32 bits in said memories, so that they respectively have capacities of 1 word and 1792 words. Also it is assumed that the outputs from the memories M1, M2 are in a high-impedance state when enable signal lines L4, L5 are in the high-level state.

The signals selectively read from the memories M1, M2 are retained in a 32-bit latch circuit L2. One of the memories M1, M2 is in the signal write-in state while the other is in the signal read-out state, and one of the latch circuits L1, L2 stores the signals of the memory M1 while the other stores the signals of the memory M2.

In this manner the latch circuit L2 alternately stores the signals from the memory M1 and those from M2. The signals stored in said latch circuit L2 are supplied to NAND gates NG1-NG32 which selectively activate transistors TP1-TP32 in response to a timing signal PG supplied from a control circuit CC through a print instruction line L10. The collectors of said transistors TP1-TP32 are connected to the data input terminals P1-P32 of said recording unit PH. In case of recording with power saving as shown in FIGS. 3 and 4, said NAND gates NG1-NG32 are replaced by AND gates A1-A32 shown in FIG. 3. The selecting signal input terminals D1-D56 of the recording unit PH are respectively connected to collectors of transistors TD1-TD56 which are sequentially scanning controlled by the output signals from a 6-to-56 line decoding circuit DC controlled over six signal lines L11 from the control circuit CC. The control circuit CC generates signals for controlling the aforementioned circuit elements in response to clock signals generated by a crystal generator.

Figure 9:
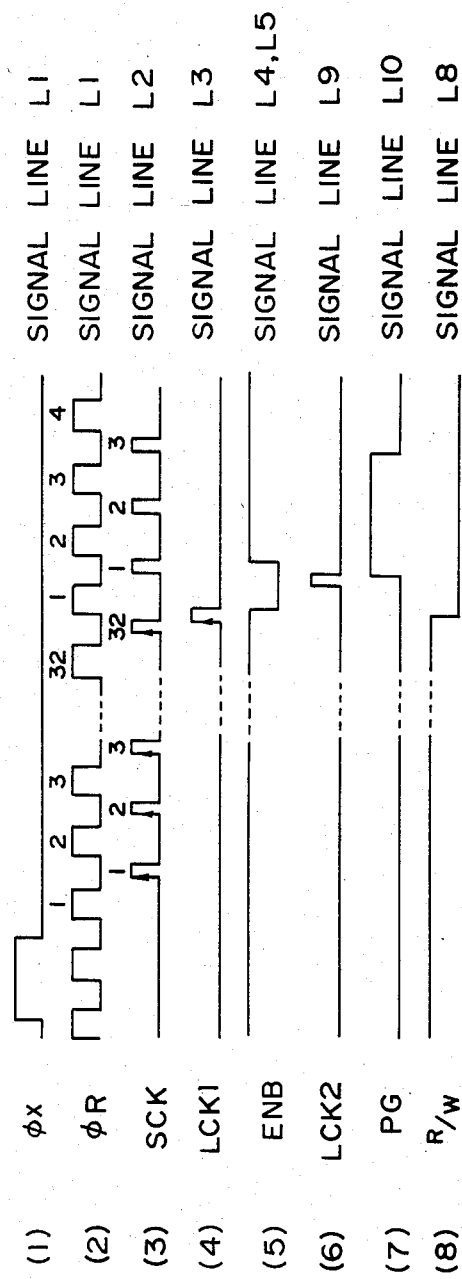
FIGS. 9 and 10 are waveform charts showing the function thereof.
Figure 10:
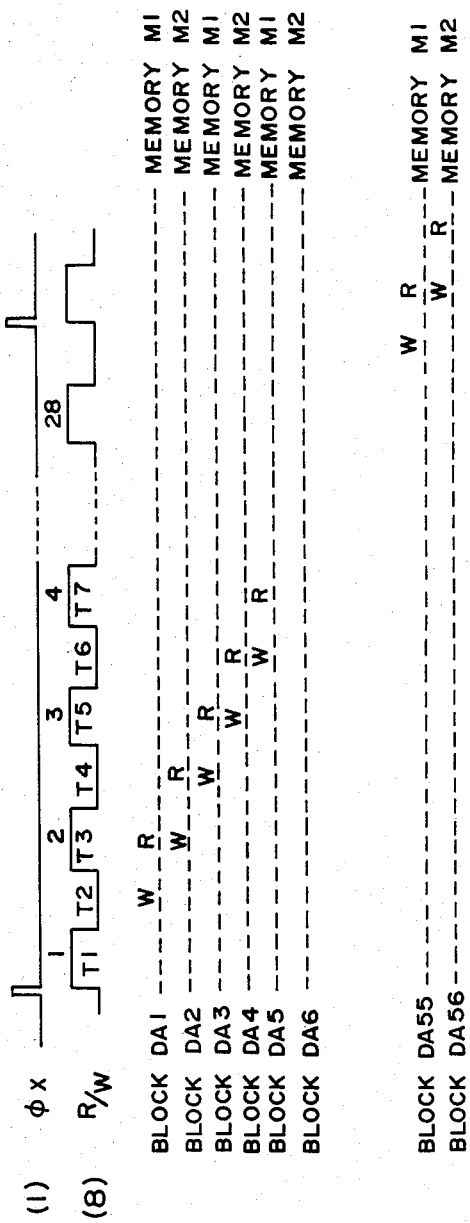

Now reference is made to FIG. 8 and to waveform charts shown in FIGS. 9 and 10 for explaining the control signals. The CCD photosensor receives a start pulse $\phi x$ for starting a line scanning and clock pulses $\phi R$ for resetting an output amplifier through a signal line L1, and unrepresented shift clock pulses $\phi 1$, $\phi 2$ for the shift registers in said photosensor. The interval of the start pulses $\phi x$ shown in FIG. 9 (1) corresponds to a line scanning time, during which 1728 reset clock pulses $\phi R$ (2) are supplied from the control circuit CC, corresponding to the bits of the CCD photosensor and causing the release of image signals at the low-level state thereof.

The control circuit CC also provides, through a signal line L2 for controlling the shift register SR, transfer signals SCK each synchronized with the reset clock pulse $\phi R$ and shifted to high-level during the low-level state of said reset clock pulse $\phi R$.

The control circuit CC also counts said transfer signals SCK and supplies, at every 32 counts, load clock signals LCK1, LCK2 respectively to the latch circuits, L1, L2 through signal lines L3, L9. As shown in FIG. 9 (4), the load clock signal LCK1 to the latch circuit L1 is shifted to the high-level state after the release of 32 shift clock pulses SCK.

A memory enable signal ENB for selecting the memories M1, M2 is shifted to the low-level state after the start of said load clock signal LCK1 for the latch circuit L1, thereby enabling the function of the memories. The load clock pulse LCK2 to the latch circuit L2 is also shifted to the high-level state during the low-level state of said memory enable signal ENB.

A read-write signal R/W for controlling the read-write function of the memories M1, M2 changes the level at every 32 reset pulses $\phi R$ as shown in FIG. 9 (8), and such level change takes place 28 times during a line scanning time. In order to achieve the mutually alternate read-write functions of the memories M1, M2, the illustrated signal R/W is supplied to the memory M2 through a signal line L7 while an inverted signal through an inverter I is supplied to the memory M1 by a signal line L8.

A signal PG supplied to the NAND gates NG1-NG32 for determining the timing and duration of power supply to the heating elements is given through a line L10 after the load clock pulse LCK2 to the latch circuit L2 as shown in FIG. 9 (7). Said signal PG is generated also at every 32 reset clock signals $\phi R$.

In case of the aforementioned time-divided drive for power saving, said signal PG is further time divided by a ring counter or a read-only memory in the control circuit CC and supplied to the aforementioned AND gates A1-A32. The binary signals supplied to the decoding circuit DC and advanced 56 times during a scanning line are supplied from a 56-bit counter stepped upon counting 32 reset signals $\phi R$, whereby the transistors TD1-TD56 are successively turned on at every 32 reset signals $\phi R$ to supply selecting drive pulses to the terminals D1-D56 shown in FIG. 1, thus activating the heating elements. Now the function of the circuit shown in FIG. 8 will be further explained in reference to the waveform charts shown in FIGS. 9 and 10. After the start of the CCD start pulse $\phi x$, the read-write signal R/W causes, in the low-levelled latter half of the first cycle, the transfer of signals for the heating elements of the odd-numbered block DA1 from the shift register SR to the memory M1 through the latch circuit L1, the high-levelled former half of said first cycle being utilized for memory write-in and read-out corresponding to two last blocks of the preceding scanning line. In the former half of the succeeding second cycle, the signals stored in the memory M1 in the first cycle are supplied to the latch circuit L2, and the signals for the second block DA2 are stored in the memory M2. Then in the latter half of the second cycle, the signals for the third block DA3 are stored in the memory M1, and the signal for the second block DA2 are supplied to the latch L2. Similar procedures are repeated thereafter, and the signal read-out from the last odd-numbered block DA55 and the signal write-in and read-out for the last even-numbered block DA56 are connected during the scanning function of the CCD for the succeeding line. The memory M1, having a capacity of 1 word $\times$ 32 bits as explained before, releases the entered signals in the immediately succeeding cycle, whereas the signals in the memory M2 are read only after 64 scanning lines or 1792 read-write cycles. In this manner the even-numbered block are given the signals read 64 lines earlier by the CCD. Such delay is made in consideration of the aforementioned distance of 64 lines, or 8 mm, between the odd-numbered block and the even-numbered blocks.

For this reason address selection is required for the memory M2.

Figure 11:
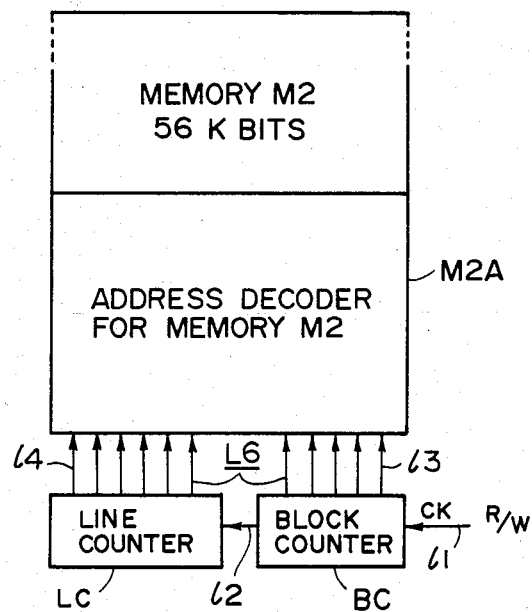
FIG. 11 is a view showing the details of a part of the memory.

FIG. 11 schematically shows the addressing system for the memory M2, wherein provided are an address decoding circuit M2A in the memory M2, and a block counter BC and a line counter LC in the control circuit CC.

The memory M2 has a capacity of 56 kbits, in which a word or a block is constituted by a 32 bits, and a line is constituted by 28 words or 896 bits, so that the above-mentioned capacity corresponds to 64 lines.

A 28-bit block counter BC is activated at the trailing ends of the read-write signals R/W to perform counting as shown in FIG. 10.

A 64-bit line counter LC is activated by a carry-over signal of said block counter BC supplied through a signal line l2. An output line l3 of the block counter BC and an output line l4 of the line counter LC correspond to addressing line L6 shown in FIG. 8 and the signals supplied through said lines are decoded in the address decoding circuit M2A to select the memory addresses. In the memory M2, after signal write-in for an m-th block in an n-th line, the block counter BC is step advanced to read an (m+1)-th block in the n-th line, thus completing one read-write cycle. In the succeeding read-write cycle the signal write-in is conducted for said (m+1)-th block in the n-th line. The value of m is reset to zero after reaching 28 to select a succeeding line, and the value of n is reset to zero after reaching 64.

Figure 12:
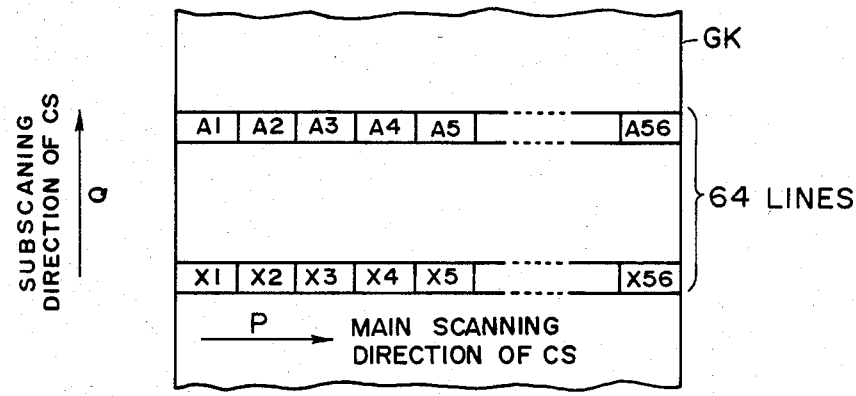
FIG. 12 is a view showing the data transfer.

FIG. 12 shows the state of image information on an original document GK and the state of signal transition in the latches and memories.

Signals A1 of 32 bits loaded in the latch L1 at a time T1 are stored in the memory M1 at a time T2. Also at said time T2, signals A2 of 32 bits, succeeding to the above-mentioned signals A1, are loaded in the latch L1. At a time T3, the signals A1 in the memory M1 are transferred to the latch L2 while the signals A2 in said latch L1 are stored in the memory M2, and succeeding signals A3 are loaded in the latch L. At a time T4 signals X2 are loaded in the latch L2 while signals A3 in the latch L1 are stored in the memory M1, and signals A4 are loaded in the latch L1. The above-mentioned procedure is thereafter repeated in a similar manner. Signals x2, x4, . . . indicate those read 64 lines earlier by the CCD and stored in the memory M2.

Figure 13:
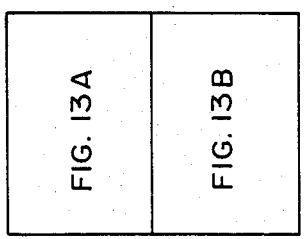
FIGS. 13, 13A, and 13B are a control flow chart for the apparatus.
Figure 13A:
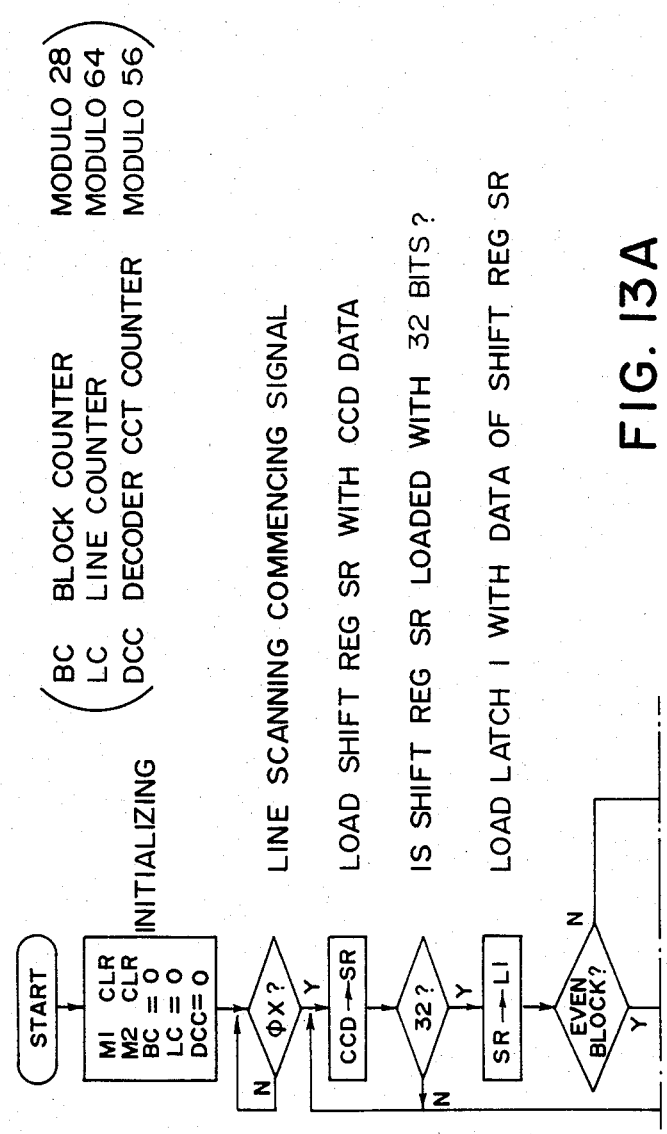
Figure 13B:
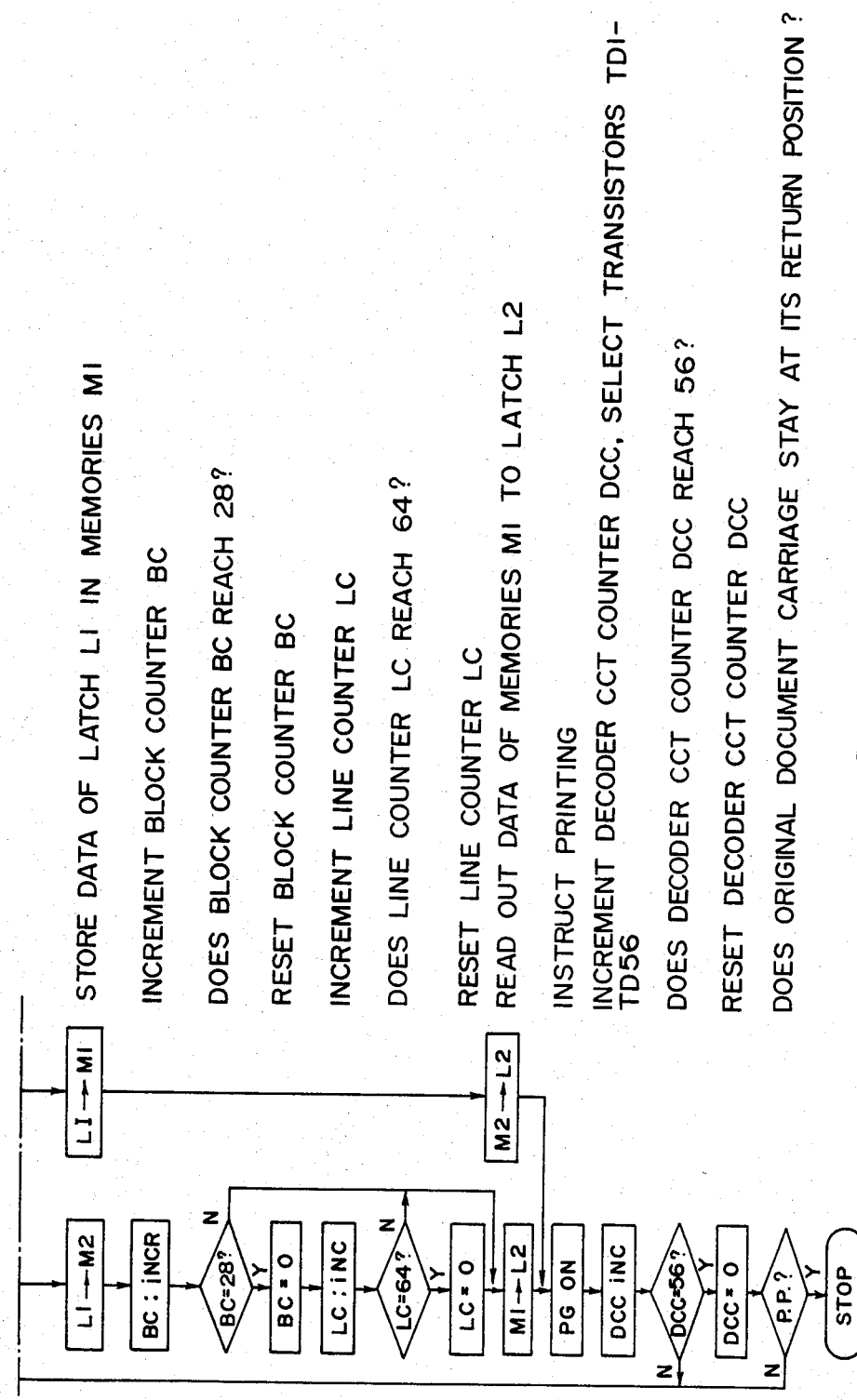

The aforementioned procedures are summarized in the flow chart shown in FIG. 13.

Figure 14:
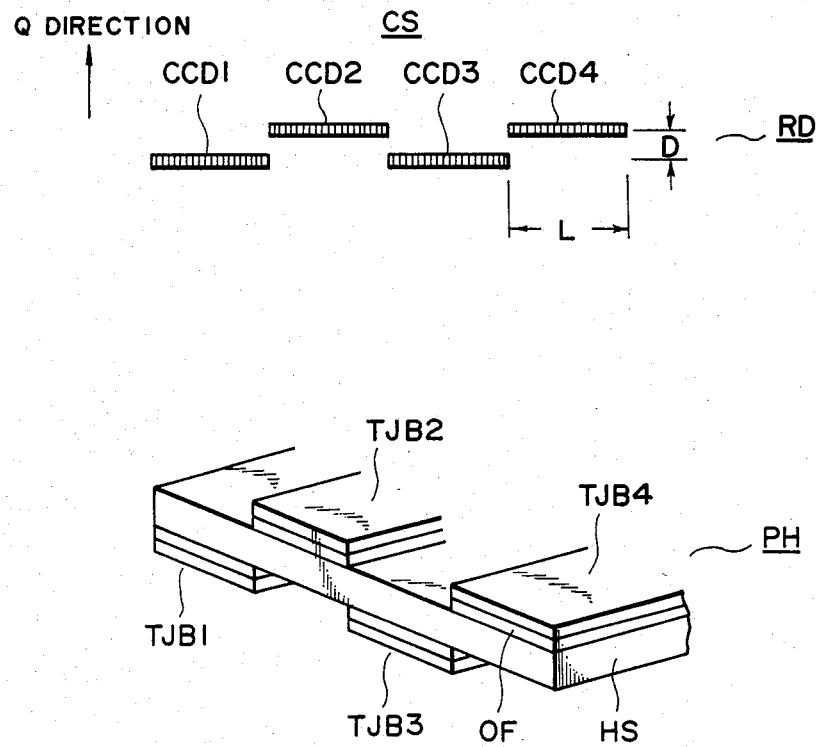
FIG. 14 is a schematic view showing another embodiment of the original reading and recording units.

FIG. 14 shows another embodiment of the original reading unit RD and the recording unit PH, wherein the self-scanning photosensor is composed of a plurality of photosensor elements capable of converting optical input signals into electrical signals and is capable of sequentially processing said signals. In the embodiment shown in FIG. 14, the photosensor is composed of four CCD photosensors CCD1-CCD4, each having 512 bits corresponding to an effective length L of 12.8 mm ($25\mu \times 512$).

Such CCD photosensors can cover a width of 205 mm in the direction P in FIG. 7 through a lens system with an image reduction ratio of 4 times, thus providing a resolving power of 10 dots/mm with 2048 bits in total.

Consequently the recording unit PH is provided with 10 heating elements per millimeter. The recording unit is composed of recording blocks alternately positioned on and under the heat sink HS, constituting a full-line multiple recording head. For example 2048 ink jet nozzles are divided into four blocks TJB1-TJB4 each having 512 heating elements. The orifices of the first and third blocks TJB1, TJB3 on the heat sink HS and those of the second and fourth blocks TJB2, TJB4 are mutually spaced in the vertical direction by a distance of 28 mm corresponding to 280 lines.

Such recording head, if combined with a linear photosensor of 2048 bits as employed in the foregoing embodiment, will require a memory of 280 Kbits corresponding to the image information contained in the above-mentioned distance. Said memory corresponds to the second memory of 56 Kbits explained in relation to FIG. 5.

In the present embodiment, however, a photosensor arrangement corresponding to the arrangement of the recording head is shown in FIG. 14 eliminates the necessity for such memory. In such embodiment the CCD photosensors are scanned in a direction Q, and the recording unit is driven simply by the obtained signals. The vertical distance D between the CCD sensors CCD2, CCD4 and those CCD1, CCD3 can be selected as 7 mm in consideration of the vertical distance 28 mm between the recording blocks TJB2, TJB4 and those TJB1, TJB3 and of the image reducing ratio of 4 times.

Figure 15:
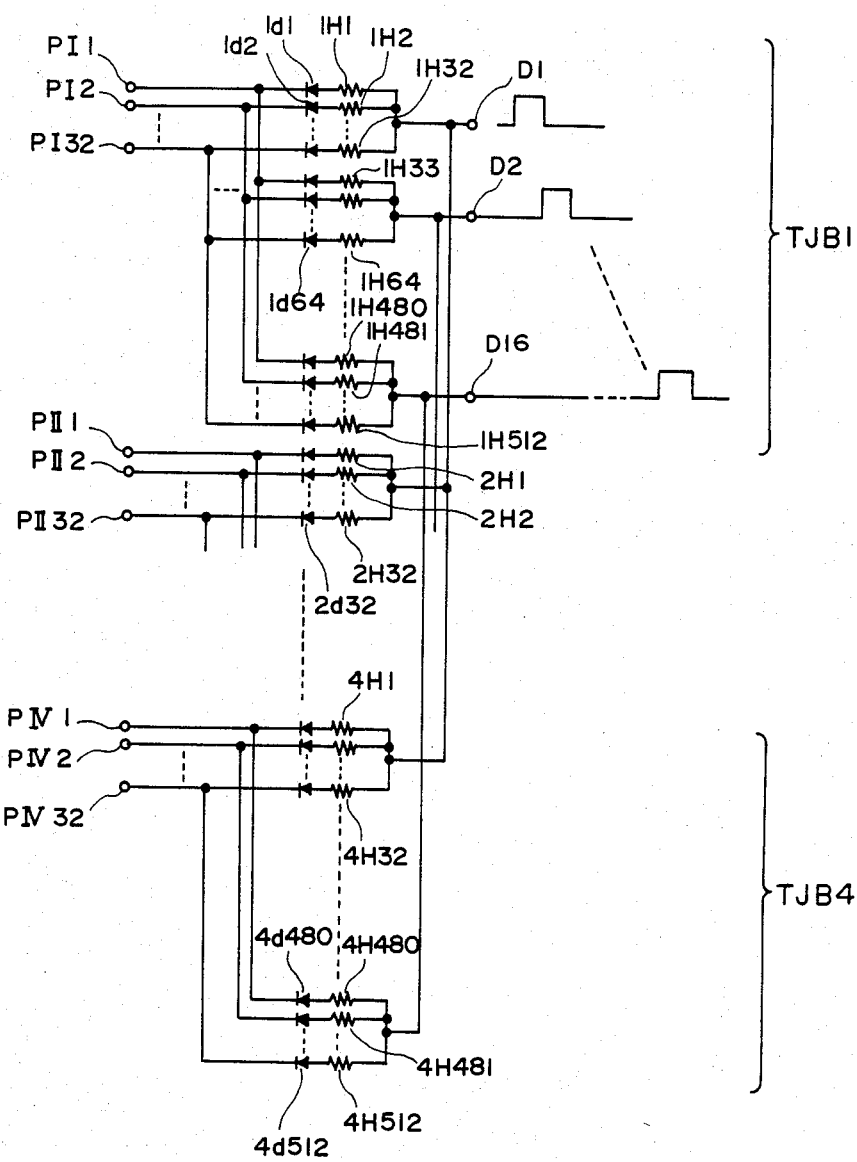
FIG. 15 is a circuit diagram showing an example of the drive circuit therefor.

FIG. 15 shows a drive circuit for the recording unit PH shown in FIG. 14, wherein provided are heating elements 1H1-4H512 and diodes 1d1-4d512 for preventing signal crosstalk. 2048 heating elements are divided into four blocks (TJB1-TJB4 shown in FIG. 14) in each of which 512 heating elements are divided into groups of 32 elements for time-divided drive with a duty ratio of 1/16. In the first block TJB1, therefore, 512 heating elements 1H1-1H512 can be activated on time-divided basis by selecting 32 image signal input terminals PI1-PI332 and 16 selecting signal input terminals D1-D16. The entire recording block is composed of four blocks identical with said first block in the structure and in the driving method.

Figure 16:
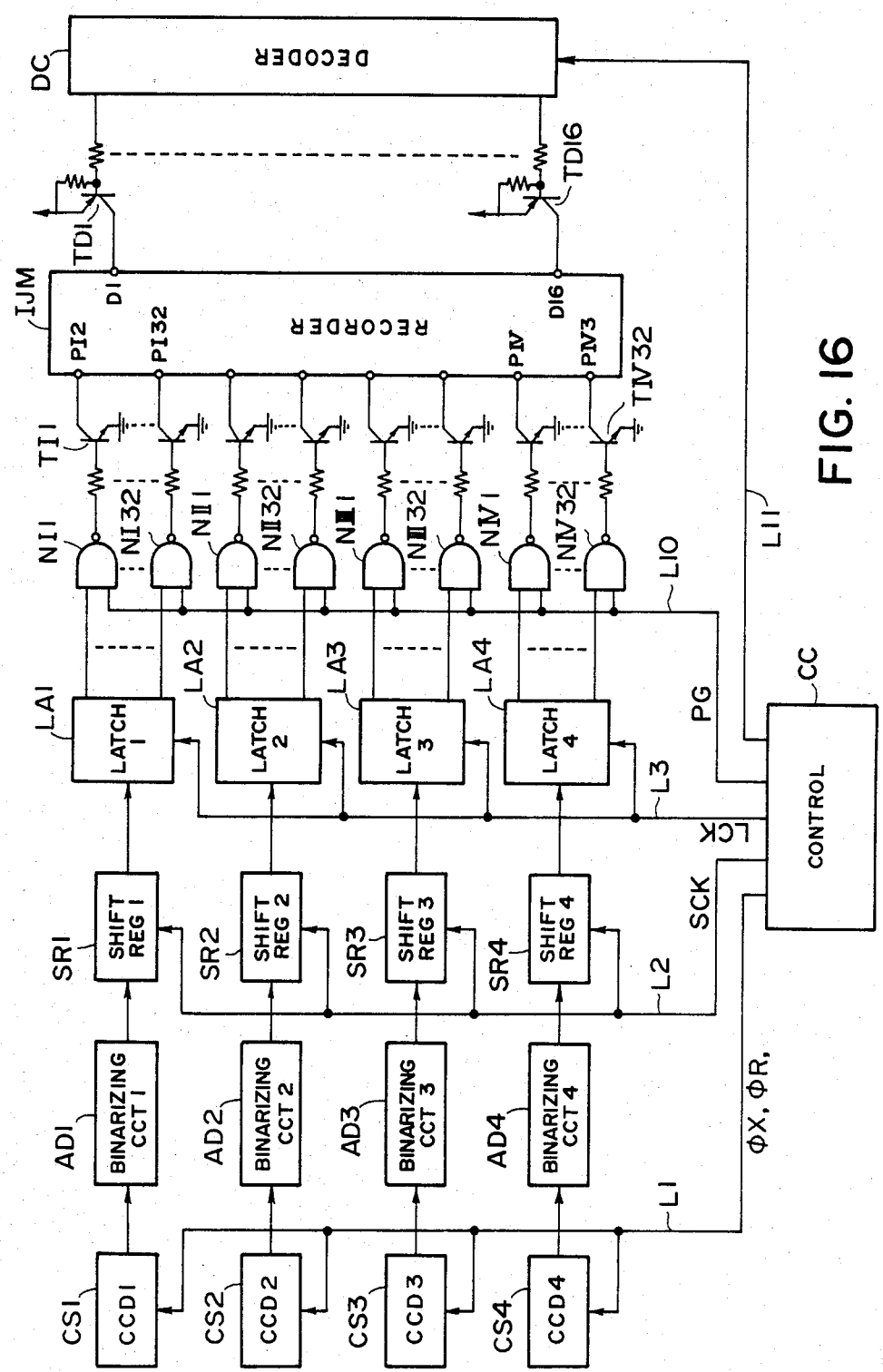
FIG. 16 is a block diagram for driving the entire apparatus.

FIG. 16 is a block diagram of a circuit for driving the present embodiment, wherein CCD photosensors CCD1-CCD4, A/D converters AD1-AD4, shift registers SR1-SR4 and latch circuits LA1-LA4 are distributed in the identical manner corresponding to four blocks shown in FIG. 14, so that the following describes the circuit for one block only.

The photosensor CCD1, composed of a CCD photosensor of 512 bits as explained before, scans ¼ of a scanning line and provides voltage levels corresponding to the image information, and said voltage levels are converted into binary signals in the A/D converter AD1.

Said A/D converter is composed of a comparator for providing binary signals by comparing the output voltage of the CCD sensor with a reference voltage or a slice level. In case tonal rendition is required in the image reproduction, said signals are converted into three or more levels.

The digitized signals obtained from said converter AD1 are supplied to a 32-bit shift register SR1 for serial-parallel conversion, and the signals are thereafter processed in the 32-bit parallel form. The output signals from said shift register SR1 are stored in a 32-bit latch circuit LA1, and supplied to 32 NAND gates NI1-NI32 for selectively activating transistors TI1-TI32 in synchronization with a print instruction signal PG. Collectors of the NPN transistors TI1-TI32 are respectively connected to image signal input terminals PI1-PI32.

16 selecting signal input terminals D1-D16 are respectively connected to collectors of PNP transistors TD1-TD16, which are sequentially controlled by the output signal from a 4-to-16 line decoder CD for sequentially selecting 16 lines from TD1 to TD16 in response to signals from a control circuit CC.

Said control circuit CC generates drive clock signals for the CCD photosensors, shift clock signals for the shift register, clock signals for the latch circuits, timing clock signals for gates and selecting signals for the decoding circuit in response to reference clock signals generated by a crystal oscillator.

Figure 17:
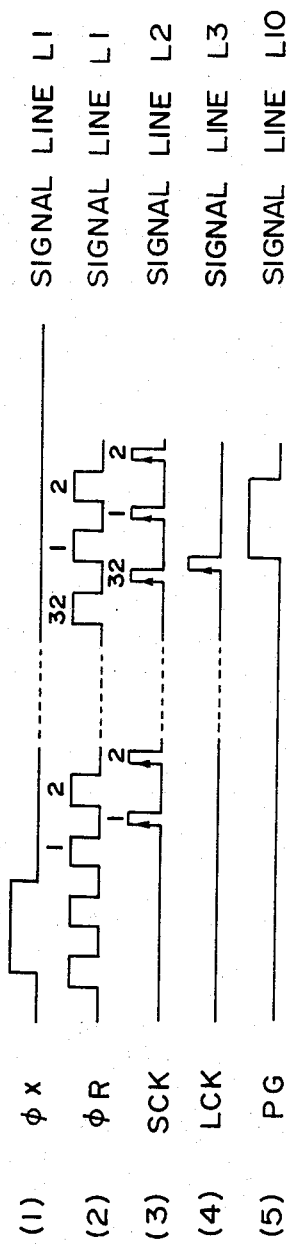
FIG. 17 is a waveform chart showing the function thereof.

Various control signals will now be explained in reference to FIGS. 16 and 17. The photosensors CCD1-CCD4 receive, from the control circuit CC, a start pulse $\phi x$ shown in FIG. 17 (1) and clock pulses $\phi R$ for resetting an output amplifier as shown in FIG. 17 (2) through a signal line L1, and unrepresented shift clock signals $\phi 1$, $\phi 2$ for two-phase drive of the shift registers. The interval of the start pulses $\phi x$ corresponds to a line scanning time, during which 512 reset clock pulses $\phi R$ are supplied from the control circuit CC, corresponding to the bits of the CCD photosensors and causing the release of image signals at the low-level state of said clock pulses.

The control circuit CC also provides, through a signal line L2 for controlling the shift register SR1, transfer signals SCK each synchronized with the reset clock pulse $\phi R$ and shifted to high-level state during the low-level state of said reset clock pulse $\phi R$ as shown in FIG. 17 (3).

The control circuit CC also counts said transfer signals SCK and supplies, at every 32 counts, a load clock signal to the latch circuits LA1-LA4 through a signal line L3. As shown in FIG. 17 (4), the load clock signal to the latch circuits LA1-LA4 is shifted to the high-level state after the release of 32 shift clock pulses SCK shown in FIG. 17 (3).

A signal PG supplied to the gates NI1-NE32 for determining the timing and duration of power supply to the heating elements is given through a signal line L11 succeeding to the load clock pulse LCK as shown in FIG. 17 (5) and at every 32 reset clock pulses $\phi R$.

Binary signals supplied to the decoding circuit DC are increased 16 times during a scanning line and are supplied from a hexadecimal counter stepping upon 32 counts of the CCD reset signals $\phi R$, whereby the transistors TD1-TD16 are in succession turned on at every 32 reset pulses $\phi R$ (cf. D1-D16 in FIG. 2).

The present embodiment is capable of significantly economizing the memory capacity in comparison with the foregoing embodiment and is therefore extremely advantageous.

Naturally the CCD photosensors CCD1-CCD4 and the recording blocks TJB1-TJB4 may be arranged linearly for obtaining a same effect, if the precision of manufacture allows such arrangement. Still such block structure allows easy individual replacement in case of a failure and facilitates to achieve a higher precision in the manufacture.

Figure 18:
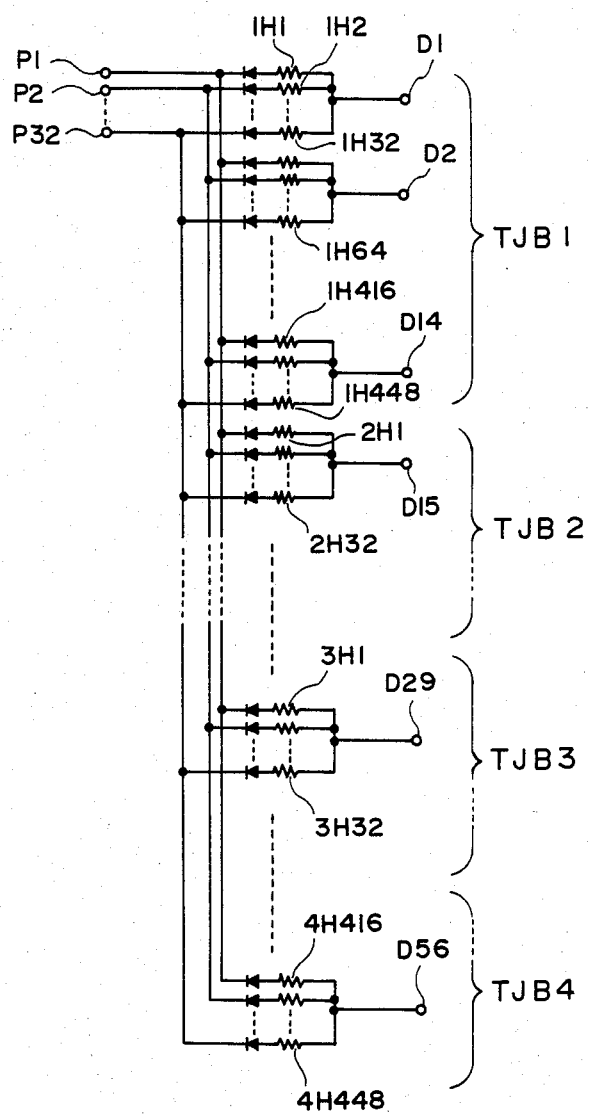
FIG. 18 is a circuit diagram showing another embodiment of the drive circuit.
Figure 19:
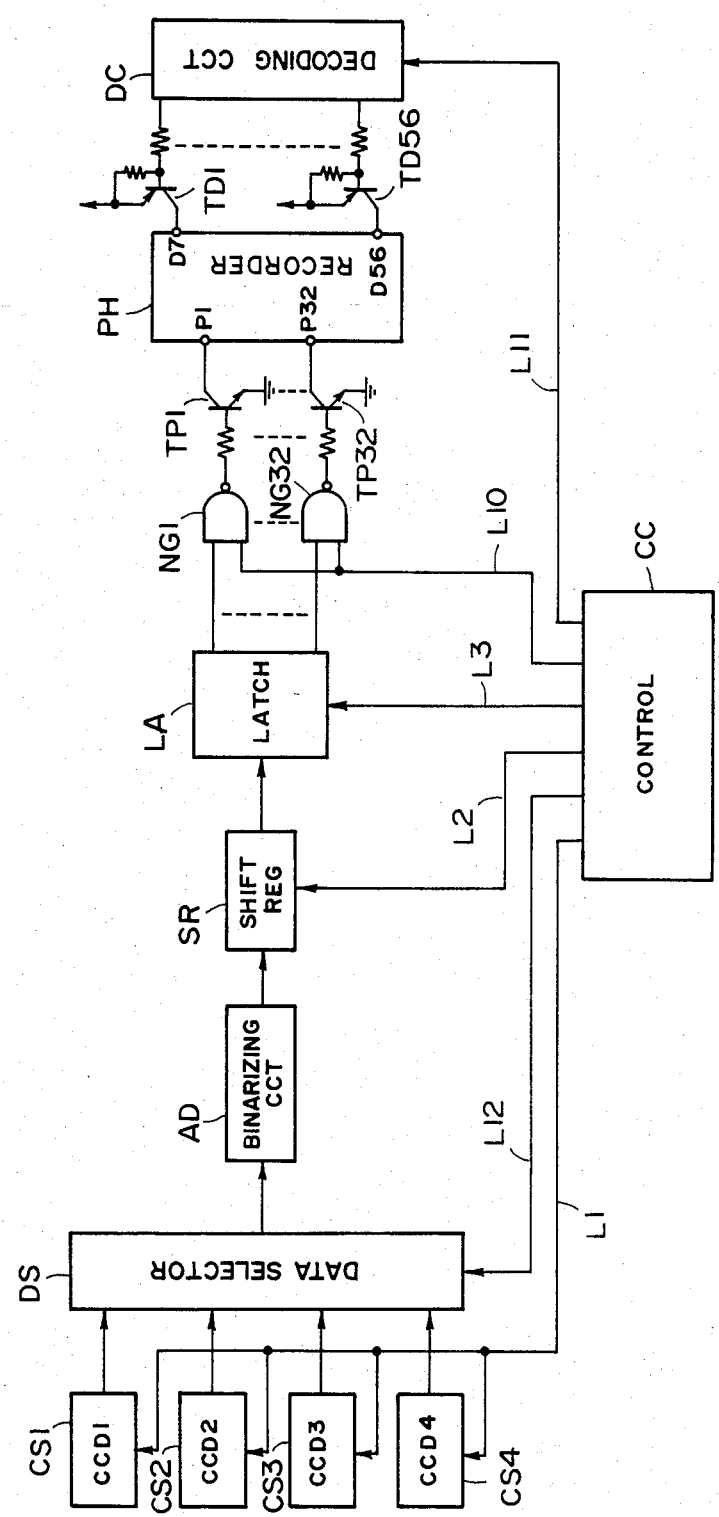
FIG. 19 is a block diagram of another embodiment of the entire apparatus.

FIGS. 18 and 19 show still another embodiment of the present invention wherein the geometrical arrangements in the recording unit PH and in the image reading unit RD are same as those in the foregoing embodiment. The present embodiment is featured by a much simplified structure having a reduced number of matrix wirings and by the common use of a signal processing circuit for four CCD photosensors. In contrast to the circuit shown in FIG. 16 where the signals for four CCD sensors are processed in parallel manner, the circuit shown in FIG. 19 performs serial time-divided signal processing.

The drive circuit shown in FIG. 18 is provided with 1792 heating elements 1H1–4H448 respectively connected to crosstalk preventing diodes. Said heating elements are divided into four blocks, each having 14 scan signal input terminals, for example D1–D14. The other ends of said heating elements are cyclically connected, at every 32 elements, to 32 image signal input terminals P1–P32.

The output signals from four CCD photosensors CS1–CS4 shown in FIG. 19 are supplied to a 4-to-1 line analog data selector DS, which selects said four CCD photosensors for each quarter of the scanning line (205 mm in length on the platen) to construct a scanning line by serially connecting the output signals from said four CCD photosensors, in response to signals supplied from the control circuit CC through a control signal line L12.

The signals are thereafter processed in the aforementioned manner through an A/D converter AD, a 32-bit shift register SR, a 32-bit latch circuit LA, 32 NAND gates NG1–NG32 and transistors TP1–TP32 for signal supply to the image signal input terminals P1–P32. In present embodiment there is employed a 6-to-56 line decoding circuit DC.

Although the present embodiment requires a 4-times longer processing time, but such prolonged signal processing is practically negligible in consideration of the response frequency of the thermal ink jet recording method.

Figure 20:
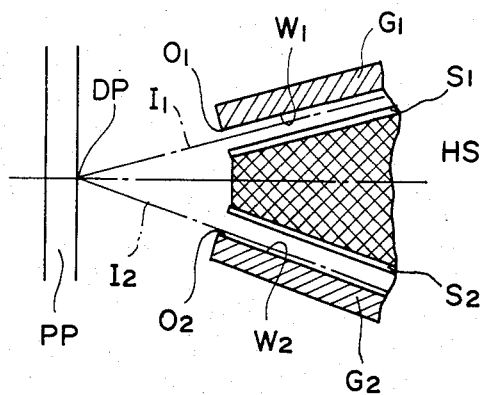
FIG. 20 is a schematic view of still another embodiment of the recording unit.

FIG. 20 schematically shows another embodiment of the recording unit in a partial cross-sectional view, wherein substrates S1, S2 with heating elements are adhered on a tapered metal plate HS and are covered with grooved plates G1, G2 to constitute liquid chambers W1, W2 on both sides of said metal plate HS.

The liquid chamber W1 emits ink droplets in a direction I1 from an orifice O1, while the liquid chamber W2 emits ink droplets in a direction I2 from and orifice O2, and said ink droplets are thus directed toward a common line DP on the recording sheet PP.

Consequently the obtained recording does not show vertical aberration even if the grooved plates G1, G2 are arranged in a staggered manner as shown in FIG. 14, so that the photosensor CS need not be of a staggered arrangement as shown in FIG. 14 but may be composed of a commercially available linear sensor.

Also the signal processing circuit can be advantageously simplified as shown in FIG. 19.

Figure 21:
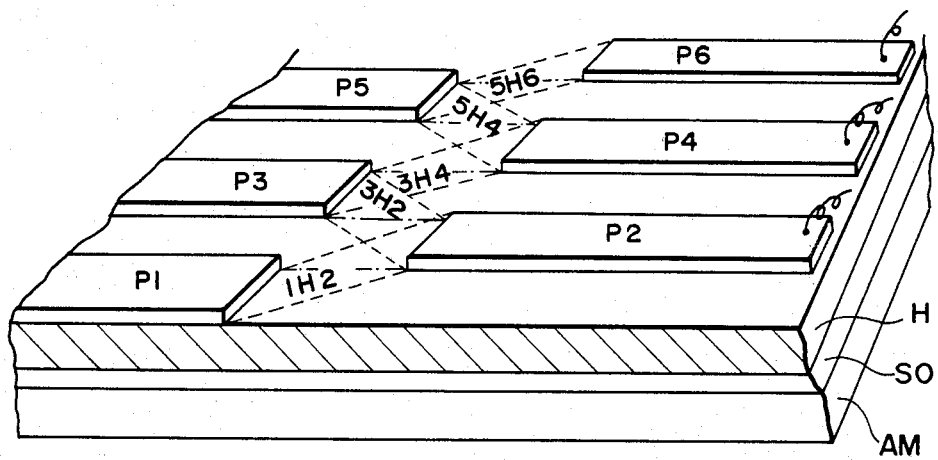
FIG. 21 is a schematic view of still another embodiment of the recording unit.

FIG. 21 shows another embodiment of the arrangement of the heating elements allowing easy and inexpensive manufacture with increased element density. In this embodiment, heating element areas 1H2, 3H2, 3H4, 5H4 and 5H6 are formed by positioning selecting electrodes P1–P6 on a heating resistor layer H, whereby an element area, for example 1H2, can be selected by supplying a drive pulse between the electrodes P1 and P2. Similarly an element area 5H4 can be heated by selecting the electrodes P5 and P4, and a selecting circuit for such purpose can be easily realized. Such embodiment is extremely advantageous since the etching of the resistor layer H can be dispersed with. However said layer may naturally be etched at certain positions if desirable.

Figure 22:
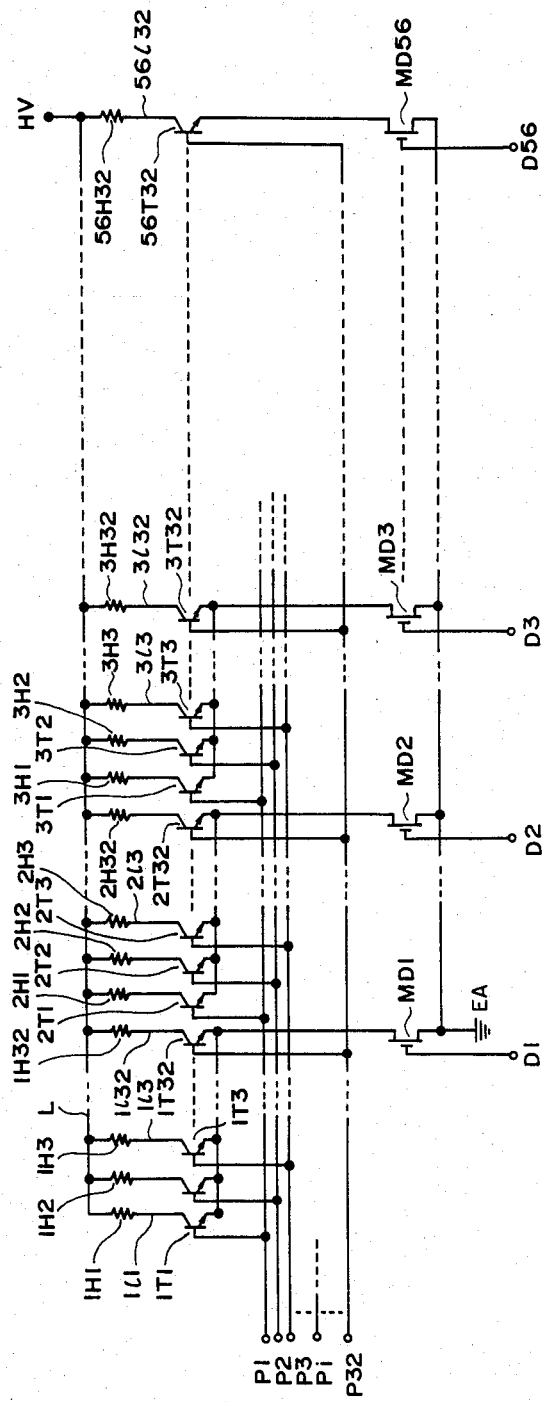
FIG. 22 is a circuit diagram showing still another embodiment of the circuit applicable to the present invention.

FIG. 22 shows still another embodiment of the circuit applicable in the present invention, wherein plural heating elements 1H1–56H32 are commonly connected at one ends thereof and are respectively connected at the other ends to control elements, for example collectors of transistors 1T1–56T32. Said transistors are divided into groups, each of which is formed as a transistor array chip containing for example the transistors 1T1–1T32. The emitters of the transistors on each chip are commonly connected to one of chip selecting switch elements MD1–MD56, while bases of corresponding transistors on 32 chips are commonly connected to one of pixel information input terminals P1–P32.

In order to activate for example the heating element 1H1, the switching element MD1 is turned on while other switching elements MD2–MD56 are turned off, and the pixel signal is supplied to the terminal P1. Consequently the transistor 1T1 is turned on, and the heating element 1H1 is heated through a circuit HV-1H1-1T1-MD1-EA (ground).

In this state the transistors 1T2–1T32 are biased in the forward direction between the collectors and emitters thereof, but said transistors are not activated due to the absence of pixel information input to the terminals P2–P32. Also the pixel signal supplied from the terminal P1 is supplied only to the transistor 1T1 to activate the heating element 1H1 along since the switching elements MD2–MD56 are turned off.

In this manner the heating elements can be selectively activated by the combination of the switching elements MD1–MD56 and the pixel information input terminals P1–P32.

Figure 23:
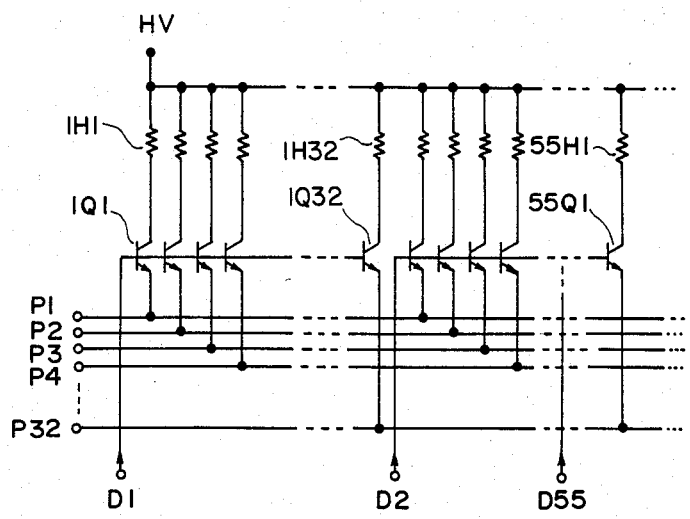
FIGS. 23 and 24 are circuit diagrams showing still other embodiments.

FIG. 23 shows another embodiment of the circuit in which transistor arrays with commonly connected bases instead of the commonly connected emitters in the preceding embodiment. In this embodiment the current amplifying effect of each transistor is utilized for reducing the current in each emitter on the array and in the external lead connected to the common bases, thereby decreasing the load to the drive circuit and alleviating the restrictions on the bonding wires.

Figure 24:
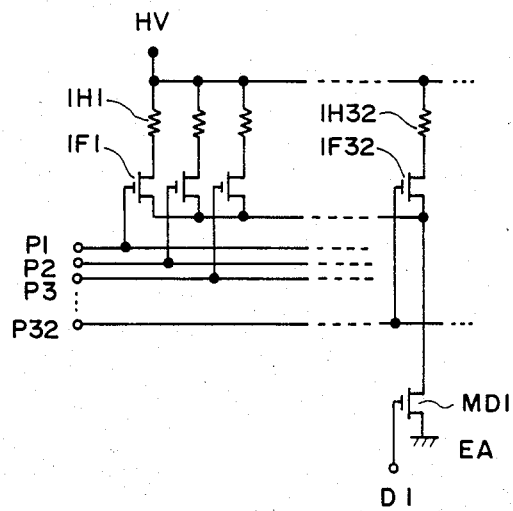

Also FIG. 24 shows an embodiment composed entirely of field-effect transistors for reducing the power required for driving and achieving faster signal processing with a simplified circuit structure, utilizing the faster switching and transmitting performance of such transistors.

It will be readily understood that the circuit shown in FIG. 24 may be easily modified to a circuit utilizing commonly connected gates. Also the circuit shown in FIG. 1 may be composed of bipolar transistors. Furthermore the NPN transistors or N-channel field-effect transistors may be replaced by PNP transistors or P-channel field-effect transistors by inverting the polarity of the power supply.

Figure 25:
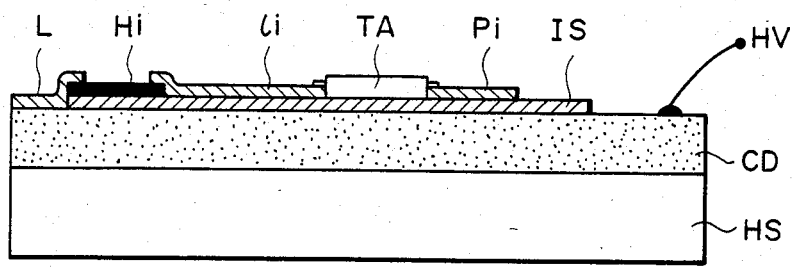
FIGS. 25, 26 and 27 are schematic views showing embodiments of recording head.

FIG. 25 shows, in a cross-sectional view, an example of the recording head usable in the drive circuits shown in FIGS. 22, 23 and 24, wherein a heating element Hi is provided on an insulating layer IS under which there is provided a conductive substrate CD and a heat sink HS.

Said insulating layer IS not only functions for electric insulation but also as a heat accumulating layer for controlling the heat flux generated by said heating element Hi.

The heating element Hi positioned on said insulating layer IS is provided with a selecting electrode li and a common electrode L for supplying selectively pixel signals to said heating element. Said common electrode L is connected commonly to all the heating elements 1H1–56H32 and is connected also to a power source HV through the conductive substrate CD. Also selecting electrodes li are connected to the output terminals of the transistor array TA, and the input terminals of said array TA are connected to at least one of the block selecting electrodes D1–D56 and to the pixel selecting electrodes P1–P32.

Figure 26:
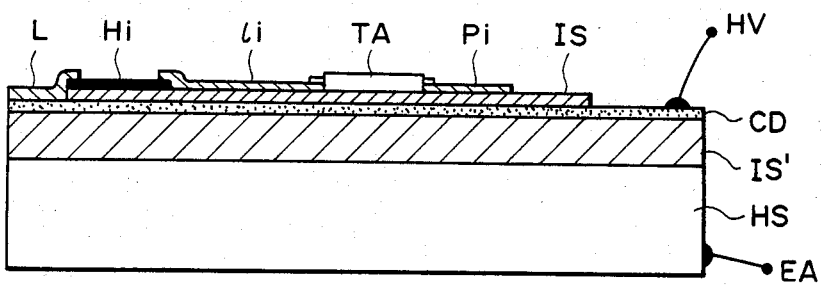

FIG. 26 shows another embodiment of the recording head, wherein an insulating substrate IS' is formed under the conductive layer CD, and the heat sink HS is made conductive to constitute an electrode of the ground potential EA. It will be also obvious that the conductive layer CD can be connected to the ground potential EA and the power source HV can be connected to the heat sink HS or another place. The heat sink HS functions for dissipating the heat generated by the heating element Hi.

The conductive layer is conveniently formed by a metal such as Al or Au, and the heating element can be formed for example of $ZrB_2$, $HfB_2$, $Ta_2N$, W, Ni-Cr, thick film resistors essentially composed of Pd-Ag or Ru, $SnD_2$ etc.

Figure 27:
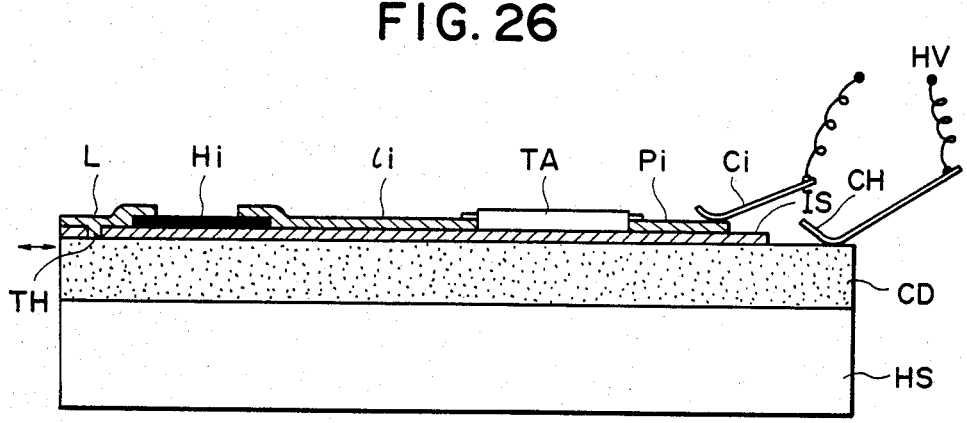

A thin insulating protective layer may be advantageously formed on the surface of the electrodes Pi, li, Di etc. and of the heating element Hi in order to avoid mechanical abrasion. Also the common electrode L can be connected to the conductive layer CD by way of a through hole TH as shown in FIG. 27. Furthermore a plurality of conductive electrode layers and insulating layers may be alternately formed in order to realize a large number of selecting electrodes in a plane. Also the use of connectors Ci, CH are favorable in order to facilitate assembling and disassembling.

Figure 28:
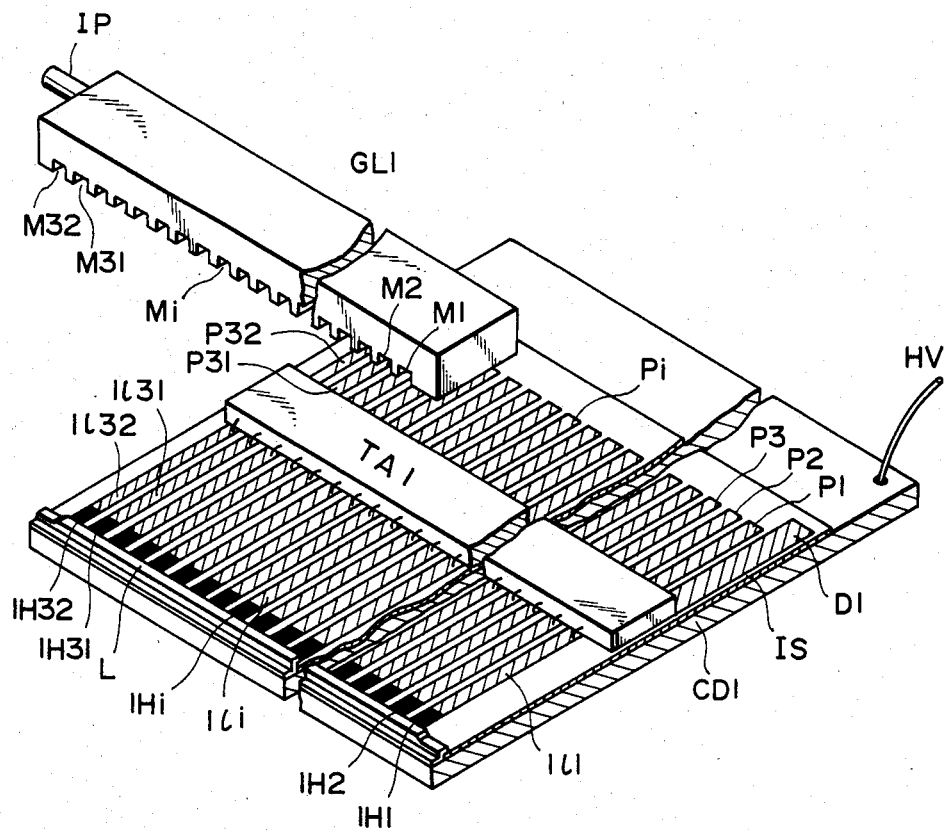
FIG. 28 is a perspective view showing the structure of the recording head embodying the present invention.

FIG. 28 shows an embodiment of the ink jet recording head in which a grooved plate GL1 formed from a glass plate is adhered onto the aforementioned substrate with heating elements.

What we claim is:

1. A recording apparatus utilizing heating elements for thermal recording on a recording sheet, comprising:
   a plurality of heating elements arranged with such a high density as to enable recording with a resolving power of at least 8 dots/mm;
   a plurality of transistors divided into groups each containing at least 32 transistors for driving said heating elements;
   at least 32 gates for driving said transistors;
   a latch circuit of at least 32 bits;
   a serial-in-parallel-out shift register of at least 32 bits for loading pixel signals into said latch circuit; and
   input means for entering pixel signals into said shift register.

2. A recording apparatus according to claim 1, wherein said heating elements are divided into groups driven on time-divided basis.

3. A recording apparatus according to claim 1, wherein said recording elements are divided into groups driven on a time-divided basis.

4. A recording apparatus according to claim 1, wherein said apparatus comprises a copier apparatus.

5. A recording apparatus according to claim 1, wherein said apparatus comprises a facsimile apparatus.

6. A recording apparatus, comprising:
   a common conductor;
   a plurality of recording elements arranged to record with a resolving power of at least 8 dots/mm, each of said plurality of recording elements having one edge connected to said plurality of recording elements and including a plurality of control elements for controlling the drive of said common conductor; and
   a base having a plurality of groups of chips arranged thereon such that in a direction parallel to that in which said common conductor extends the Nth chip and (N+1)th chip fail to be adjacent to each other.

7. An apparatus according to claim 6, further comprising first input means for chip selection and second input means for inputting pixel formation, said first and said second input means being coupled to a respective one of said chips.

8. A recording apparatus, comprising:
   a plurality of recording elements;
   a plurality of transistors divided into groups each containing at least 32 transistors for driving said plurality of recording elements;
   at least 32 gates for driving said plurality of transistors;
   a latch circuit of at least 32 bits;
   a serial-in-parallel-out shift register of at least 32 bits for loading pixel signals into said latch circuit; and
   input means for entering pixel signals into said shift register.

9. An apparatus according to claim 8, wherein said logic means includes field effect transistors.

10. An apparatus, comprising: a base;
    a plurality of droplet generating means provided on said base;
    a common conductor disposed on said base and connected to one end of each of said droplet generating means;
    first drive signal generating means for driving selectively said plurality of droplet generating means;
    second drive signal generating means for driving said plurality of droplet generating means; and
    logic means having a plurality of portions to correspond to said plurality of droplet generating means, each portion having two input terminals for receiving drive signals from said first and second drive signal generating means, respectively, and having one output terminal coupled to the other end of an associated one of said droplet generating means.

11. An apparatus according to claim 10, wherein said plurality of droplet generating means include heating elements.

12. An apparatus according to claim 10, wherein said plurality of droplet generating means are arranged on a common electro-conductive substrate.

13. An apparatus according to claim 10, further comprising means for providing time dividing selective drive signals from said first drive signal generating means.

14. A recording apparatus for forming visual indicia on a recording member, comprising:

a plurality of electrically operable recording element means for causing deposit of a recording liquid on a recording member; and control means including a plurality of groups of control units each being arranged to control the operation of a respective recording element means, and means for applying to each said control unit group selection signals and unit selection signals, wherein all the control units of each group are adapted to receive the group selection signal to select that group and are adapted to receive the unit selection signal to select that control unit, each control unit operates the respective recording element means in response to both the group and unit selection signals.

15. A recording apparatus according to claim 14, wherein each control unit includes a diode arranged to gate a drive current to the recording element means in response to receipt concurrently of the group and unit selection signals.

16. A recording apparatus for forming visual indicia on a recording member, comprising:

a base;

a plurality of electrically operable recording element means arranged on said base;

a common conductor disposed on said base and commonly coupling one end of said plurality of recording element means;

a plurality of logic means each having an output coupled to a respective one of the other ends of said recording element means, and having first and second input terminals;

first storage means coupled to the first terminals of each of said logic means, respectively, for storing recording information to drive said recording element means selectively;

second storage means for supplying recording information to said first storage means;

selection information generating means coupled to the second input terminals of said logic means, for generating selection information to select said logic means; and control means for performing a transfer control of the recording information between said first and second storage means, and for performing an output control of said selection information generating means.

17. A recording apparatus according to claim 16, wherein said logic means includes a field effect transistor.

18. A recording apparatus according to claim 16 or 17, wherein said logic means includes a two input gate.

19. A recording apparatus according to claim 16 or 17, wherein said first storage means includes a latch circuit.

20. A recording apparatus according to claim 16 or 17, wherein said second storage means includes a serial-in-parallel-out shift register.

21. A recording apparatus according to claim 16 or 17, wherein said recording element means each include a resistive heating element.

22. A recording apparatus according to claim 16 or 17, further comprising means for supplying recording information to said second storage means.

23. A recording apparatus according to claim 16 or 17, wherein said recording element means are arranged at such a density as to enable recording with a resolving power of at least 8 dots/mm.

* * * * *

UNITED STATES PATENT AND TRADEMARK OFFICE
CERTIFICATE OF CORRECTION

PATENT NO. : 4,520,373

DATED : May 28, 1985

INVENTOR(S) : NAOKI AYATA, ET AL.

It is certified that error appears in the above-identified patent and that said Letters Patent is hereby corrected as shown below:   Title page:

Add to List of Citations, under "Foreign Patent Documents"
```
--117643    10/1977   Japan
   45698    12/1978   Japan
  127745    11/1978   Japan
   51837     4/1979   Japan
   59936     5/1979   Japan
   10736       1977   Japan
```
Column 1, line 33, delete ",".
Column 6, line 21, delete "a" before "32".
Column 9, line 39, delete "but".

Column 12, line 10, change "plurality of recording ele-" to --common conductor--;
        line 11, delete "ments";
        line 12, change "common conduc-" to --plurality of recording elements--; and
        line 13, delete "tor".

Signed and Sealed this

Eighth Day of April 1986

[SEAL]

Attest:

DONALD J. QUIGG

Attesting Officer

Commissioner of Patents and Trademarks